United States Patent [19]

Morita

[11] Patent Number: 5,612,827
[45] Date of Patent: Mar. 18, 1997

[54] DATA RECORDER HAVING SELF-DIAGNOSTIC FUNCTION USING MAGNETIC TAPE

[75] Inventor: Shinya Morita, Kanagawa, Japan

[73] Assignee: Sony Corporation, Tokyo, Japan

[21] Appl. No.: 539,503

[22] Filed: Oct. 6, 1995

Related U.S. Application Data

[63] Continuation of Ser. No. 138,988, Oct. 21, 1993, abandoned.

[30] Foreign Application Priority Data

Oct. 21, 1992 [JP] Japan .................................. 4-307648

[51] Int. Cl.$^6$ ........................................................ G11B 5/02
[52] U.S. Cl. ........................... 360/25; 360/69; 360/132
[58] Field of Search .............................. 360/94, 132, 133, 360/69, 25, 27, 137, 128; 395/183.01; 364/54, 58

[56] References Cited

U.S. PATENT DOCUMENTS

| 3,668,658 | 6/1972 | Flores et al. ..................... 360/133 X |
| 4,338,644 | 7/1982 | Staar ................................. 360/69 X |
| 4,357,643 | 11/1982 | d'Alayer de Costemore d'Arc .... 360/137 |
| 4,796,100 | 1/1989 | Sakaguchi ......................... 369/48 X |
| 4,863,114 | 9/1989 | Moeller et al. ................... 242/188 |
| 4,903,159 | 2/1990 | Kawano ............................ 360/132 |
| 4,907,181 | 3/1990 | Hedtke et al. .................... 364/579 |
| 5,121,260 | 6/1992 | Asakawa et al. ................ 360/25 X |
| 5,469,563 | 11/1995 | Morita ............................. 395/183.01 |

FOREIGN PATENT DOCUMENTS

| 0382193 | 8/1990 | European Pat. Off. ........ G11B 15/07 |
| 0534798 | 3/1993 | European Pat. Off. ........ G11B 15/07 |
| 3719498 | 12/1988 | Germany ....................... H04N 17/06 |
| 2111945 | 7/1983 | United Kingdom ............ G11B 23/30 |

Primary Examiner—Andrew L. Sniezek
Attorney, Agent, or Firm—Jay H. Maioli

[57] ABSTRACT

A data recorder having a self-diagnostic function using a magnetic tape accommodated in a case (or cassette). The case is provided with holes indicating a grade of the magnetic tape. When the magnetic tape unit is loaded (mounted) in the data recorder, the holes are detected and identified. When the identified grade is that for the self-diagnosis, the self-diagnosis is executed using that magnetic tape. Cleaning of a head is also carried out using the identified cleaning magnetic tape.

13 Claims, 5 Drawing Sheets

D-1 CASSET TAPE FOR DATA RECORDER

| 1011 | 1010 |            |
|------|------|------------|
| 1    | 1    | 16μ        |
| 0    | 1    | 13μ        |
| 0    | 0    | CALIB TAPE |

| 1013 | 1012 |        |
|------|------|--------|
| 1    | 1    | 850 Oe |
| 0    | 1    | METAL  |

DIRECTRY SLOT

TYPES OF TEST SIGNAL IN EACH TRACK
WHEN IT IS "DATA"

```
0 0  :  ALL    0 0
0 1  :  ALL    F F
0 2  :  ALL    A A
0 3  :  ALL    5 5
0 4  :  RANDOM DATA
0 5  :  1T DATA
         ⋮
```

STRUCTURE OF DIRECTRY

DATA RECORDER HAVING SELF-DIAGNOSTIC FUNCTION USING MAGNETIC TAPE

This si a continuation of application Ser. No. 08/138,988 filed Oct. 21, 1993 abandoned.

BACKGROUND OF THE INVENTION

1. Field of the Invention

The present invention relates to a magnetic recording and reproduction apparatus, more particularly a data recorder using a magnetic tape to perform a self-diagnostic function and a means for identifying the type (grade) of the magnetic tape mounted thereon.

2. Description of the Related Art

A data recorder as one component of a magnetic recording and reproduction apparatus (system) stores on a magnetic tape a variety of signals such as process signals, for example, temperature, humidity, pressure, level, and flow; digital signals, for example, switching positions; and relay contact positions, and digital data, for example, time and recording conditions. Several types of data recorders can be employed. In a first type of data recorder, analog data is input and stored on the magnetic tape. In a second type of data recorder, analog data is input converted to digital data, and stored on the magnetic tape. In a third type of data recorder, digital data is input and stored on the magnetic tape. In these data recorders, of course, the data stored on the magnetic tape can be reproduced. During this reproduction, equalization can be performed to provide discriminated reproduction signals at a high accuracy. The magnetic tape, preferably, may be accommodated in a cassette or a case like that of a cassette tape used for a video tape recorder (VTR).

Recently, there has been a strong demand for a self-diagnosis in such data recorders. As a result, self-diagnostic programs are being loaded in such data recorders. In such a self-diagnosis, a magnetic tape on which data adaptable for an electrical test is recorded (an electrical calibration magnetic tape), a magnetic tape on which data adaptable for a mechanical test is recorded (a mechanical calibration magnetic tape), or a magnetic tape on which no data is recorded (a blank magnetic tape) is mounted in the data recorder, and then a diagnostic operation is performed in accordance with the contents recorded on the electrical calibration magnetic tape, and/or the mechanical calibration magnetic tape.

In addition to the above magnetic tapes, in data recorders, a general purpose magnetic tape used for usual data recording, a cleaning magnetic tape used for cleaning the recording head and/or reproducing head, and other magnetic tapes can be used. Normally, those magnetic tapes are accommodated in cases (or cassettes), and the data recorded thereon is directly invisible, and therefore, the user can not know what kind of contents are recorded on the magnetic tape without a visual indication on the case.

Usually, self-diagnosis is not carried out frequently. The frequency may be, for example, once per two to three months or once per year. Therefore, the user of the data recorder is not well versed with the self-diagnostic method in many cases. As a result, for example, mistaken switching of the electrical calibration magnetic tape or the mechanical calibration magnetic tape with the cleaning tape in the data recorder and actuation of the self-diagnostic function when using the mounted cleaning tape may occur. In this case, the cleaning tape will polish the reproducing head and recording head for a long time to result in abrasion of the heads. Thus, serious damage to the reproducing head and recording head may occur.

Also, there is a possibility that the electrical calibration magnetic tape and the mechanical calibration magnetic tape will be erroneously mounted in the data recorder and a self-diagnostic function not corresponding to that magnetic tape will be actuated. As a result, the results of the self-diagnosis will become complete nonsense and irrespective of the fact that the data recorder is actually normal, the user will think that there is a malfunction. Alternatively, the inconvenience that the self-diagnosis must be carried out again occurs.

Furthermore, there is a possibility of the erroneous mounting of the electrical calibration magnetic tape or the mechanical calibration magnetic tape or general purpose magnetic tape on which important data has been recorded and actuation of the self-diagnostic function. When a general purpose magnetic tape is mounted and the self-diagnostic test is performed, i.e., data is recorded on the magnetic tape, then read out and verified, destruction of data recorded on the mounted general purpose tape may occur.

That is, in a conventional data recorder, human error is apt to occur at the self diagnostic test. When a magnetic tape not corresponding to the self-diagnostic function actuated in the data recorder as mentioned above is mounted in the data recorder, serious damage may be done to the reproducing head and recording head. Also, the results of the self-diagnostic test may become nonsense, so that a normal data recorder is believed to malfunction, or trouble occurs of data of the tape not related to the self-diagnostic test being destroyed.

SUMMARY OF THE INVENTION

An object of the present invention is to provide a magnetic tape device having a means for indicating the grade (or type) of a magnetic tape accommodated in a magnetic tape unit.

Another object of the present invention is to provide a data recorder having a self-diagnostic function and a means for identifying a type of a magnetic tape by detecting the magnetic tape type indication means of the magnetic tape unit and, accordingly, enabling a desired self-diagnosis without a malfunction.

According to the present invention, there is provided a magnetic tape recording and reproduction apparatus including: a loading system for loading and ejecting a magnetic tape unit including a case and a magnetic tape accommodated in the case, the case being provided with a magnetic tape grade indication means for indicating a grade of the magnetic tape, the grade indicating for example a calibration magnetic tape, or a general purpose magnetic tape, a sensor for sensing the magnetic tape grade indication means provided on the case; a magnetic tape grade identification unit for identifying the grade of the magnetic tape of the magnetic tape unit which is loaded in the loading system in accordance with the data sensed by the sensor; an operation mode setting unit for setting an operation mode of the magnetic tape recording and reproduction apparatus; a decision unit for deciding whether or not an operation in accordance with the set operation mode is executed, the decision unit deciding to proceed with the operation when the identified magnetic tape grade is that required in the operation and deciding to stop the operation when the identified magnetic tape grade is not that required in the operation; and an execution unit for executing the operation using the magnetic tape.

The execution unit may include a normal recording and/or reproduction unit for recording data on the magnetic tape and/or reproducing the data recorded on the magnetic tape. The magnetic tape is a general purpose magnetic tape.

The execution unit may also include a self-diagnostic unit for executing a diagnosis of the magnetic tape recording and reproduction apparatus. The magnetic tape is a calibration magnetic tape.

Further, identification data of the magnetic tape is recorded on the calibration magnetic tape. The self-diagnostic unit reads the identification data and executes the self-diagnostic operation when the read identification data is appropriate.

Preferably, the identification data is repeatedly recorded on the calibration magnetic tape. The self-diagnostic unit reads the plurality of identification data and uses correct identification data.

Preferably, the self-diagnostic unit actuates the loading system to eject the loaded magnetic tape unit from the loading system when the self-diagnosis is completed or when the read identification data is not appropriate.

The calibration magnetic tape comprises an electrical calibration magnetic tape on which electrical self-diagnostic data is recorded and a mechanical calibration magnetic tape on which mechanical self-diagnostic data is recorded. The self-diagnostic unit includes an electrical self-diagnosis function for performing an electrical self-diagnostic of the magnetic tape recording and reproduction apparatus using the electrical calibration magnetic tape and a mechanical self-diagnostic function for performing a mechanical self-diagnosis of the magnetic tape recording and reproduction apparatus using the mechanical calibration magnetic tape.

Information used for the self-diagnosis may be further recorded on the calibration magnetic tape. The self-diagnostic unit executes the self-diagnostic using the information.

The information includes test data used for recording on the magnetic tape and/or for reproducing the same from the magnetic tape.

Also, the information may include directory data.

Further, the execution unit includes a unit for cleaning a recording magnetic head and/or a reproducing magnetic head using a cleaning tape.

The decision unit may actuate the loading system to eject the loaded magnetic tape unit when the magnetic tape grade is not that required in the operation.

The magnetic tape grade indication means comprises holes provided on the case. The sensor includes a light emitting means such as a light emitting device (LED) for emitting light directed to the holes when the magnetic tape unit is loaded and a light receiving means such as a photodiode for receiving the light passing through the holes and providing logical electrical signals corresponding to the received signal. The magnetic tape grade identification means identifies the magnetic tape grade in accordance with the combination of the electrical signals.

Also, the magnetic tape grade indication means may be projections provided on the case. The sensor may be a touch sensor or microswitches for detecting the projections when the magnetic tape unit is loaded and providing logical electrical signals corresponding to the projections. The magnetic tape grade identification unit identifies the magnetic tape grade in accordance with the combination of the electrical signals.

The magnetic tape grade indication means may be electrical contacts provided on the case. The sensor may be an electrical sensor for detecting the electrical contacts when the magnetic tape unit is loaded and providing logical electrical signals corresponding to the electrical contacts signal. The magnetic tape grade identification means identifies the magnetic tape grade in accordance with the combination of the electrical signals.

The apparatus may be a data recorder or a video tape recording and/or reproducing apparatus or an audio tape recording and/or reproducing apparatus.

According to the present invention, there is also provided a magnetic tape unit including a magnetic tape and a case accommodating the magnetic tape and provided with a means indicating a grade of the magnetic tape sensed by a sensor.

The magnetic tape may include data used for a test of the apparatus in which the magnetic tape unit is loaded.

BRIEF DESCRIPTION OF THE DRAWINGS

The above objects and features and other objects and features will become apparent by the following description with reference to the accompanying drawings, in which.

DESCRIPTION OF THE PREFERRED EMBODIMENTS

A first embodiment of the present invention will be described with reference to FIG. 1.

Figure 1:
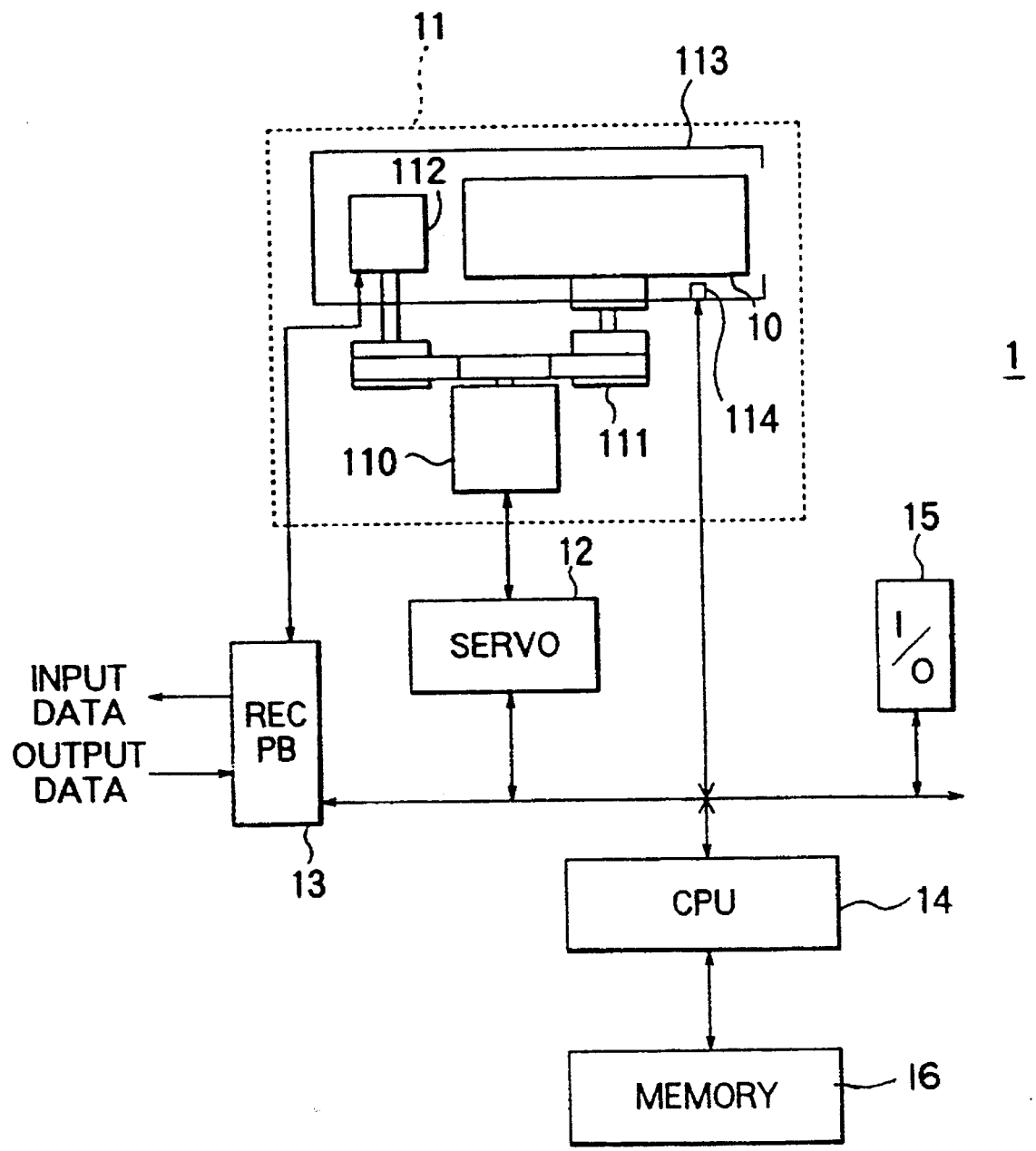
FIG. 1 is a view showing the configuration of a data recorder of a first embodiment of a magnetic tape recording and reproduction apparatus in accordance with the present invention.

FIG. 1 is a view showing the configuration of a data recorder I as an embodiment of a magnetic tape recording and reproduction apparatus in accordance with the present invention.

The data recorder 1 includes a tape drive system 11, a servo system 12, a recording and reproduction system 13, a central processor unit (CPU) 14 of a computer, an input and output data processing portion (I/O) 15, and a memory 16.

The data recorder 1 is designed to process D-1 formatted data in this embodiment, and thus this D-1 type data recorder 1 records and reproduces digital data of a D-1 format.

Various programs for processing data recording and reproduction are loaded in the memory 16. And also, programs for executing self-diagnosis are loaded in the memory 16. These programs are executed in the CPU 14. That is, the data recorder 1 has a normal data recording and reproduction function and a self-diagnostic function.

Figure 3:
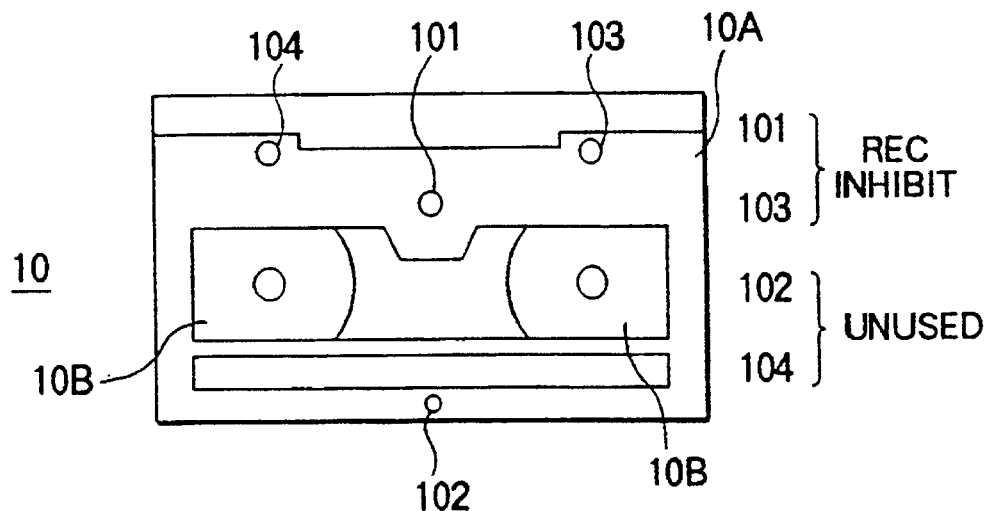
FIG. 3 is a view showing an outer shape of a cassette wherein a D-1 type magnetic tape is accommodated.

In addition to the above functions, the data recorder 1 further includes a function of identifying the grade of a magnetic tape unit 10 consisting of a cassette 10A as shown in FIG. 3 and a magnetic tape 10B accommodated therein.

The magnetic tape unit 10 is mounted on the tape drive system 11 of the data recorder 1, the magnetic tape 10B accommodated in the cassette 10A is fed out by the tape drive system 11, and the data recording and reproduction is carried out by recording and reproducing heads (not shown) built in a rotary drum 112 of the tape drive system 11.

The cassette 10A is provided with coding holes indicating the grade of the magnetic tape accommodated therein. The holes indicate whether or not the magnetic tape is a general purpose magnetic tape, a cleaning tape, an electrical calibration tape, or a mechanical calibration tape. A coding hole sensor 114 in the tape drive system 11 detects the coding holes, and the CPU 14 determines the grade of the magnetic tape.

The identification data concerning the self-diagnostic test is preliminarily recorded in a specific recording range of the calibration tape. Where the data recorder 1 identifies the magnetic tape as the calibration tape (either the electrical calibration magnetic tape or the mechanical calibration magnetic tape) by the coding holes 1014, the data recorder 1 reads out this coded data, and the data recorder 1 performs the self-diagnostic function based on this data.

The tape drive system 11 is constituted by a drive motor 110, a tape drive system 111, the rotary drum 112, a tape loading system 113, and the coding hole sensor 114 and is controlled by a servo system 12 to the magnetic tape, write of the recording signal on the magnetic tape, and read out the reproduced signal.

Here, the drive motor 110 feeds the magnetic tape and rotates of the rotary drum 112 via the tape drive system 111. The tape drive system 111 is provided with a belt, pulley, etc. and transfers the rotation of the drive motor 110 to the rotary drum 112 and the magnetic tape.

The rotary drum 112 is driven by the tape drive system 111 to perform the predetermined rotation, performs the writing of the recording signal input from a recording and reproduction system 13 on the magnetic tape by the recording head provided therein, and reading out the reproduced signal from the magnetic tape by the reproducing head provided therein, and outputting the same to the recording and reproduction system 13.

The tape loading system 113 is driven by the tape drive system 111 and performs the loading and ejection of the magnetic tape unit 10 and the feeding of the magnetic tape contacting the rotary drum 112.

The coding hole sensor 114 detects the coding holes 1014 provided in the cassette 10A by, for example, an optical detection means consisting of, for example, a light emitting device (LED) and a photo-diode. The CPU 14 identifies the grade of the magnetic tape in accordance with the detected signal.

The servo system 12 is controlled by the CPU 14 and performs the servo control of the drive motor 110.

The recording and reproduction system 13 encodes data of a digital format input to the data recorder 1 and outputs the resultant signal to the rotary drum 112 to record the same on the magnetic tape. Preferably, the recording and reproduction system 13 carries out to equalizes and reproduces the detected signal output from the reproducing head, restores the same to the data before the recording on the magnetic tape, and outputs the resultant signal from the data recorder 1.

The CPU 14 performs the control of the respective parts and various processing of the data recorder 1.

The I/O 15 is constituted by pushbutton switches, a liquid crystal display device (LCD), etc. The user uses the pushbutton switches to input the information for setting and operating the data recorder 1. This information is transferred to the CPU 14. Also, the information output from the CPU 14 is displayed for the user on the LCD.

The configuration of the data recorder 1 is similar to the configuration of the general data recorder in points other than the coding hole sensor 114 and the coding holes 1014 provided on the cassette 10A.

Figure 2:
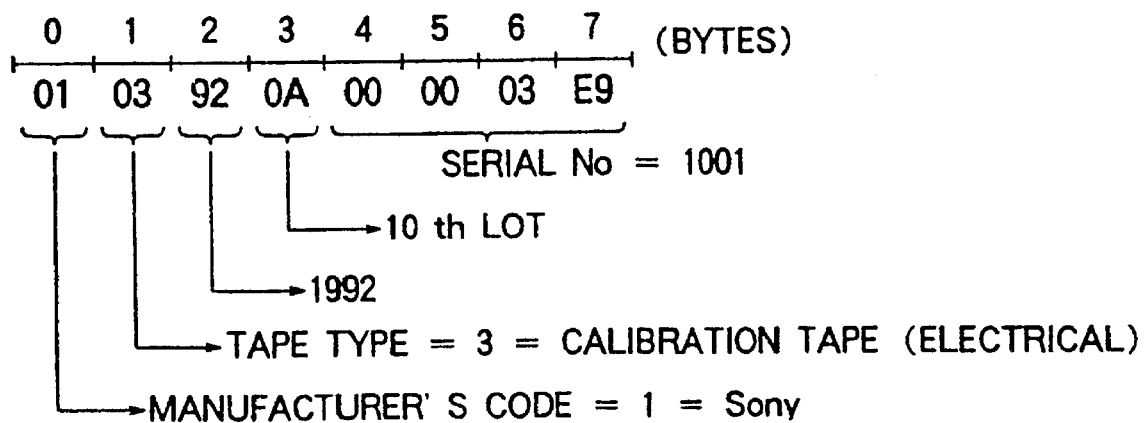
FIG. 2 is a view showing an example of identification data of a 16-byte configuration repeatedly recorded at a specific position when a magnetic tape in a cassette is a calibration magnetic tape.

FIG. 2 is a view showing an example of the identification data of a 16-byte configuration repeatedly recorded at a specified position, for example, at IDC 2048 to IDC 3072 (the length of IDC1024) where the magnetic tape is the calibration magnetic tape. Here, IDC functions as a tape counter of the magnetic tape.

Note that, the reason why the identification data is recorded at this position is that a scratch is apt to be formed at the top of the magnetic tape. Where the identification data is recorded from the top, that is, IDC 0, there is a possibility of loss of this data. Of course, the position of the identification data is not restricted to the one indicated here.

In FIG. 2, the numerals which are represented by h are expressed by hexadecimal numbers and are recorded close to the header of the tape from the left side.

The 0th byte positioned at the top in the figure is a manufacturer's code, that is, information indicating the name of the manufacturer producing the magnetic tape unit. Here, for example, Sony Corporation is expressed as the numerical value of (01)h.

The first byte is information indicating the grade of the magnetic tape. For example, the numerical value of (03)h expresses the electrical calibration magnetic tape, and the numerical value of (04)h expresses the mechanical calibration magnetic tape. Here, this part is (03)h and indicates that this magnetic tape is an electrical calibration magnetic tape.

As the grade of the calibration magnetic tape, for example, where magnetic tape recording data for diagnosis of the malfunctioning portion of the data recorder 1 and reference data etc. exist in addition to this, the numerical values here are assigned sequentially to the grades thereof.

At the second byte, the year of production of the magnetic tape unit 10, which expresses 1992 here as (92)h, and at the third byte, (0A)h expressing the production lot number are recorded. At the fourth byte to seventh byte, (000003E9)h expressing the production number of the magnetic tape unit 10 is recorded.

The above-mentioned number of bytes of identification data and numerical values of the above-described identification data are examples and should be the numerical values individually corresponding to the operation of the self-diagnostic test of the data recorder 1 and magnetic tape unit 10.

FIG. 3 is a view indicating the outer shape of the cassette 10A of the magnetic tape unit 10. The cassette 10A has an outer shape as shown in FIG. 3 and is provided with holes 101 to 104 at the positions indicated in the figure. Among these holes, record inhibition (REC INHIBIT) holes 101 and 103 express the inhibition of recording with respect to this magnetic tape. Opening of any of the REC INHIBIT holes 101 and 103 means that recording is inhibited for this magnetic tape. The holes 102 and 104 are not used for a specific purpose in this embodiment.

Figures 4A, 4B, 4C:
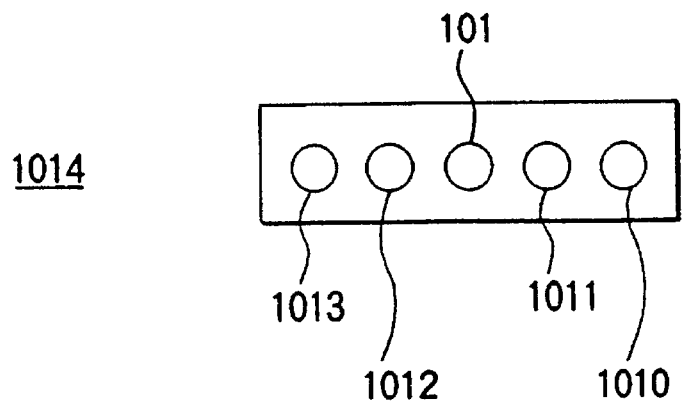
FIG. 4a is a view showing coding holes provided in the back of a recording inhibition portion of the cassette shown in FIG. 3.
FIG. 4b is a table showing the relationship between the combination of the coding holes and the thickness of the magnetic tape.
FIG. 4c is a table showing the relationship between the combination of the coding holes and the type of the magnetic tape.

FIG. 4a is a view showing coding holes 1014 provided on the back of the REC INHIBIT hole 101. As shown in the figure, the coding holes 1014 are constituted by four holes 1010 to 1103. For example, a logical value "1" is expressed where a hole is opened, while the logical value "0" is expressed where a hole is not opened. The data recorder 1, more specifically, the CPU 14, is constituted so that light is reflected when these holes are not opened, while the light is not reflected when they are opened. When the magnetic tape unit 10 is loaded (mounted) on the tape drive system 11, the coding hole sensor 114 detects whether or not each hole is opened by irradiating light such as from an LED to the coding holes 1014 and detecting the reflected beam therefrom.

FIG. 4b is a table indicating the information expressed by the holes 1011 and 1010. Where the holes 1011 and 1010 indicate the logical values (1, 1) as shown in the diagram, it is expressed that the thickness of the magnetic tape in the magnetic tape unit 10 is 16 µm, while where they indicate the logical values (0, 1), it is expressed that the thickness is 13 µm.

Here, let us decide that where for example the holes 1011 and 1010 indicate the logical values (0, 0), it is expressed that the magnetic tape 10 is a calibration magnetic tape.

FIG. 4c is a table indicating the information expressed by the holes 1013 and 1012. Where the holes 1013 and 1012 indicate the logical values (1, 1) as shown in the diagram, it is expressed that the magnetic tape is a general purpose magnetic tape (850Oe), while when the logical values (0, 1) are indicated, it is expressed that the magnetic tape is a metal tape.

An explanation will be made below of the operation of the data recorder 1 at the time of a self-diagnostic test. Here, an electrical self-diagnostic test will be mentioned, but the operation is similar also in the case of a mechanical self-diagnostic test. Also, the type of the self-diagnosis is not restricted to the ones explained here. It can be also a self-diagnostic test which diagnoses trouble spots or which performs the normal readout of the reference data.

The user sets up the data recorder through the pushbuttons to perform the electrical self-diagnostic test. Here, the user sets it up so that an electrical self-diagnostic test, for example, a self-diagnostic test for confirming the normal operation of the reproducing head and recording head, is carried out. This setting up is transferred to the CPU 14 through the I/O 15. The CPU 14 controls the respective parts of the data recorder 1 and sets various modes for performing the electrical self-diagnostic test. When it completes the setup, the CPU 14 displays a message on the liquid crystal display device of the I/O 15 instructing the user to mount the electrical calibration magnetic tape unit in the loading system 113.

The user, seeing this message on the LCD, mounts the magnetic tape unit 10 at the predetermined position of the loading system 113. Information recorded on the magnetic tape of the magnetic tape unit 10 which has been mounted is transferred to the CPU 14. When the magnetic tape unit 10 is loaded at the predetermined position, the coding holes 1010 to 1013 (1014) are detected and the CPU 14 identifies the grade of the magnetic tape.

Here, where the logical values of the above-described holes 1011 and 1010 are ones other than (0,0), the CPU 14 decides that the magnetic tape is not the calibration magnetic tape, displays its decision on the liquid crystal display device of the I/O 15, and further controls the servo system 12 to eject the magnetic tape unit 10 from the loading system 113. On the other hand, where the logical value of the above-described holes 1011 and 1010 is (0,0), the CPU 14 controls the respective parts and starts to feed the magnetic tape and read the data from the magnetic tape. At this time, it first reads out the identification data recorded at the part of the IDC 2048 to IDC 3072 of the magnetic tape.

Where the 0th byte of this identification data is not (01)h, or where the first byte is not (03)h, or where it is not repeated a predetermined number of times, for example, four times, it is decided that the magnetic tape is not the electrical calibration magnetic tape. The CPU 14 displays this decision on the liquid crystal display device of the I/O 15 to notify the same to the user and further controls the servo system 12 to eject the magnetic tape unit 10 from the loading system 113. On the other hand, where the identification data of the magnetic tape does not correspond to the above-described condition, the CPU 14 decides that the magnetic tape is the electrical calibration magnetic tape, controls the respective parts, and performs the electrical self-diagnostic test using the magnetic tape. The electrical self-diagnostic test routine using the magnetic tape is then ended. A detailed description of the electrical self-diagnostic test will be made with reference to FIG. 5 and FIG. 6.

Here, the function mentioned in the first embodiment can be selectively used. For example, where an inappropriate magnetic tape unit is mounted, it is also possible to only display this fact on the liquid crystal display device and not eject the magnetic tape unit from the loading system. Moreover, it is also possible to perform only the decision of the grade of the magnetic tape unit by the coding holes 1014 and not perform the decision by the identification data.

By constituting the data recorder 1 in the above way, the trouble of a cleaning tape being erroneously mounted on the data recorder 1 in place of the calibration magnetic tape and thereby damaging the reproduction head and recording head or the trouble of mounting the erroneous calibration magnetic tape and thereby obtaining nonsensical results of the self-diagnostic test will not occur.

Figure 5:
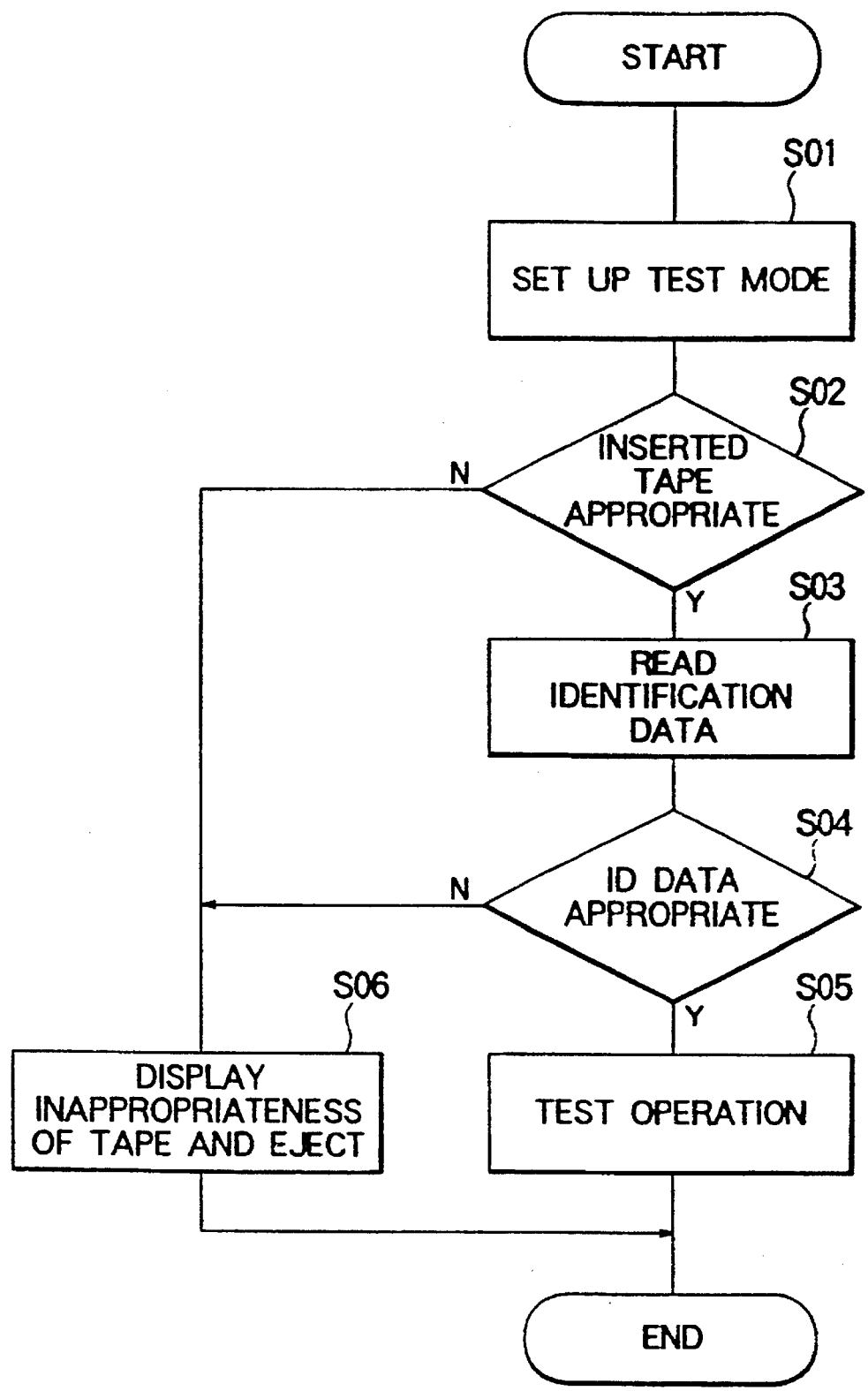
FIG. 5 is a flow chart showing an electrical self-diagnosis routine in the data recorder shown in FIG. 1.

FIG. 5 is a flow chart showing in detail the electrical self-diagnostic test routine mentioned above.

At step 01 (S01), the CPU 14 performs the setup for performing the electrical self-diagnostic test for respective parts of the data recorder 1 based on the setup information input to the I/O 15.

At step 02 (S02), when the magnetic tape unit 10 is mounted, the CPU 14 reads the coding holes 1014 detected by the coding hole sensor 114 and decides whether or not the magnetic tape is a calibration magnetic tape. Where the loaded magnetic tape is a calibration magnetic tape, the routine proceeds to the processing of step 03 (S03). Where the loaded magnetic tape is not a calibration magnetic tape, the routine proceeds to the processing at step 06 (S06).

At step 03 (S03), the CPU 14 reads out the identification data recorded on the loaded magnetic tape.

At step 04 (S04), where the 0th byte of the identification data is not (01 h), where the first byte is not (03 h), or where it is not repeated a predetermined number of times, for example, four times, the CPU 14 decides that the magnetic tape is not an electrical calibration magnetic tape, and the routine proceeds to the processing of step 06 (S06). In cases other than this, the routine proceeds to the processing of step 05 (S05).

At step 05 (S05), the CPU 14 controls the respective parts of the data recorder 1 to perform the electrical self-diagnostic test.

At step 06 (S06), the CPU 14 displays on the liquid crystal display device of the I/O 15 that the magnetic tape is inappropriate and controls the servo system 12 to eject the magnetic tape unit 10 from the loading system 113.

An explanation will be made below of a second embodiment.

In the second embodiment, the information used for the processing of the CPU 14 when new data is added to the above-described identification data and the self-diagnostic test is carried out is recorded on a magnetic tape.

Figure 6:
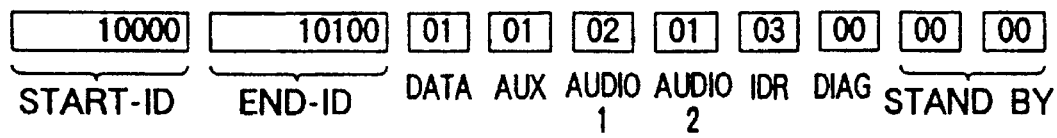
FIG. 6 is a view showing an example of the configuration of identification data recorded on the electrical calibration magnetic tape.

FIG. 6 is a view indicating an example of the configuration of the identification data recorded on the electrical calibration magnetic tape wherein the new data is added. Note that, the electrical calibration magnetic tape will be mentioned as an example, but similar magnetic tapes can be used also for the mechanical calibration magnetic tape etc.

The identification data (hereinafter described as the directory slot) to which the new data is added is used together with the identification data shown in FIG. 2 (hereinafter described as the identification data A) to record the grade of the data recorded for each track of the electrical calibration magnetic tape.

In identification data B of this embodiment, a start ID is positioned at the top side of the electrical calibration magnetic tape and sequentially recorded as shown in FIG. 6.

The start ID indicates the top IDR at which the data corresponding to this directory slot is recorded as (10000)h. An end ID indicates the final IDR at which the data corresponding to this directory slot is recorded as (10100)h. Here, IDR is information recorded on the magnetic tape for specifying the position of the data on the magnetic tape.

The following byte data is information indicating what grade of information is recorded from the start ID to the end ID of the track on which that directory slot is recorded. The data indicates the contents of the data recorded as the test data. Here, when the data is (00)h, the recorded data is all (00)h. Similarly, when the data is (01)h, the recorded data is all (FF)h; when the data is (02)h, the recorded data is all (AA)h; when the data is (03)h, the recorded data is all (55)h; when the data is (04)h, the recorded data is random data; and when the data is (05)h, the recorded data is IT data (data giving the highest recording density).

AUX is standby information used in the ID-1 format.

The AUDI01 and AUDI02 are audio information used for the self-diagnostic test.

IDR is information indicating the method of change, for example, increment one by one or no change.

DIAG is other special information and is used, for example, for the adjustment of the head.

The STANDBY is standby information which is used for expansion in the future.

Figure 7:
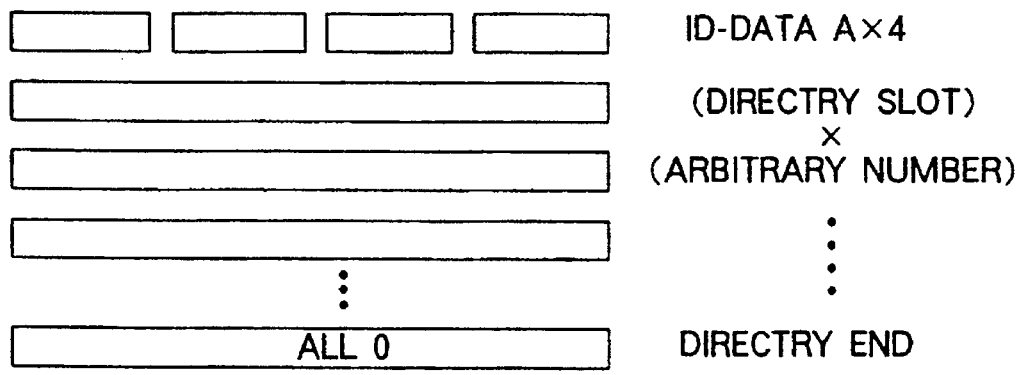
FIG. 7 is a view showing a format of identification data A and a directory slot recorded on the electrical calibration magnetic tape.

FIG. 7 shows the configuration of identification data A and a directory slot on the electrical calibration tape.

As shown in FIG. 7, the identification data A and directory slot are repeatedly recorded from the IDC 2048 to IDC 3072 (length IDC 1024) in the same way as indicated in for example the first embodiment.

First, the identification data A is recorded repeatedly four times, then the directory slot is recorded the required number of times, and finally ALL (0)h having the same information length as the directory slot is recorded as the ending identifier.

The data recorder 1 identifies that the magnetic tape is the electrical calibration magnetic tape using the top four identification data A in the same way as shown in the first embodiment and performs the self-diagnostic test. The data recorder 1 reads out the directory slot at the self-diagnostic test and uses the information included in it. At this time, among the test data designated by the directory slot, a part which is not supported (the self-diagnostic test using that test data is not carried out) is ignored, and the self-diagnostic test corresponding to the next test data is carried out.

By constituting the data recorder 1 in this way, even if the contents of the calibration magnetic tape are changed, it is possible to perform the self-diagnostic test of the data recorder 1 using the magnetic tape after the change.

By adding the directory slot to the identification data, in addition to an effect indicated in the first embodiment, it becomes possible to perform a finer self-diagnostic test and becomes possible to increase the flexibility of processing of the self-diagnostic test.

Note that, it is also possible to constitute the data recorder so that the self-diagnostic test is automatically started by the coding holes 1014 and the identification data A after mounting the calibration magnetic tape.

Moreover, it is also possible to constitute the data recorder 1 so that a plurality of grades of self-diagnostic tests can be carried out by the same calibration magnetic tape by further adding the identification data.

Further, it is also possible to constitute the data recorder so that the cleaning of the reproducing head and/or recording head is automatically carried out for a predetermined time at the mounting of a cleaning tape by providing coding holes corresponding to the cleaning tape.

In addition to the above, it is also possible to adopt various structures as the data recorder 1 of the present invention, for example, to change the format of the identification data. The above-mentioned embodiments are merely examples.

The D-1 type data recorder 1 handling digital data is described as one example of the present invention, but the present invention can be applied to other types of data recorders, for example, a data recorder receiving analog data and recording analog data on a magnetic tape, and another data recorder receiving analog data, converting digital data, and recording the same on a magnetic tape. Of course, the present invention can be applied to a variety of magnetic tape recording and reproduction apparatuses, such as a digital audio signal tape recorder (DATA) or a video tape recorder (VTR).

Coding holes are described as a means for indicating a grade of a magnetic tape, but other magnetic tape indication means can be provided on the magnetic tape unit. For example, Projections can be provided on the magnetic tape unit, instead of the coding holes. In this case, a touch sensor or microswitches for detecting the projections can be used instead of the coding hole sensor 114. Also, electrical contacts can be provided on the magnetic tape unit. In this case, an electrical sensing device can be used for detecting the contacts.

As mentioned above, according to the present invention, it becomes possible to provide a magnetic tape recording and reproduction apparatus which can prevent trouble occurring along with the incompatibility between the grade of the tape mounted on the apparatus and the operation of the apparatus.

Many widely different embodiments of the present invention may be constructed without departing from the spirit and scope of the present invention, and it should be understood that the present invention is not restricted to the specific embodiments described above.

What is claim is:

1. A magnetic tape recording and reproduction apparatus for use with different grades of tapes including a data recording tape, a cleaning tape, and a calibration tape loaded therein and capable of executing a self-diagnostic operation, the apparatus comprising:

a magnetic tape unit including a case and a magnetic tape accommodated in said case, said magnetic tape having a grade of one of a data recording tape, a cleaning tape, and a calibration tape, wherein said magnetic tape having a grade of a calibration tape includes identification data recorded thereon corresponding to a type of calibration;

magnetic tape grade indication means provided on said case for indicating the grade of said magnetic tape;

loading means for loading said magnetic tape unit on said magnetic tape recording and reproduction apparatus and ejecting said magnetic tape unit from said apparatus;

sensing means for sensing said magnetic tape grade indication means provided on said case of said magnetic tape unit when said magnetic tape unit is loaded on said recording and reproduction apparatus;

magnetic tape grade identification means for identifying the grade of said magnetic tape in accordance with data sensed by said sensing means;

reading means for reading said identification data recorded on said calibration tape;

operation mode setting means for setting an operation mode of said magnetic tape recording and reproduction apparatus, wherein said operation mode is one of a data recording operation mode, a cleaning operation mode and a self-diagnostic operation mode for executing a selected type of calibration;

decision means for deciding whether to eject said tape unit, said decision means deciding to actuate said loading means to eject said loaded magnetic tape unit when the identified grade of said magnetic tape is not the grade required in said set operation mode; and execution means for executing said operation using said magnetic tape in accordance with a decision of said decision means not to eject said tape unit, wherein when said set operation mode is a self-diagnostic operation mode, said execution means executes said operation only when said identification data corresponds to the selected type of calibration and, wherein said execution means actuates said loading means to eject said loaded magnetic tape unit from said loading means when said read identification data is not appropriate for said self-diagnosis operation.

2. A magnetic tape recording and reproduction apparatus according to claim 1, wherein said calibration magnetic tape comprises an electrical calibration magnetic tape on which electrical self-diagnostic data is recorded and a mechanical calibration magnetic tape on which mechanical self-diagnostic data is recorded; and said execution means comprises electrical self-diagnosis means for performing an electrical self-diagnostic of said magnetic tape recording and reproduction apparatus in accordance with said electrical calibration magnetic tape and mechanical self-diagnostic means for performing mechanical self-diagnosis of said magnetic tape recording and reproduction apparatus in accordance with said mechanical calibration magnetic tape.

3. A magnetic tape recording and reproduction apparatus according to claim 1, wherein said execution means comprises a means for cleaning a recording magnetic head and/or a reproducing magnetic head, and said magnetic tape comprises a cleaning tape.

4. A magnetic tape recording and reproduction apparatus according to claim 1, wherein said magnetic tape grade indication means comprises holes provided on said case, said sensing means comprises light emitting means for emitting light directed to said holes when said magnetic tape unit is loaded and light receiving means for receiving the light passing through said holes and providing logical electrical signals corresponding to said received light, and said magnetic tape grade identification means identifies said magnetic tape grade in accordance with said electrical signals.

5. A magnetic tape recording and reproduction apparatus according to claim 1, wherein said magnetic tape grade indication means comprises projections provided on said case, said sensing means comprises microswitches, for detecting said projections when said magnetic tape unit is loaded and providing logical electrical signals corresponding to said projections, and said magnetic tape grade identification means identifies said magnetic tape grade in accordance with said electrical signals.

6. A magnetic tape recording and reproduction apparatus according to claim 1, wherein said magnetic tape grade indication means comprises electrical contacts provided on said case, said sensing means comprises electrical sensing means for detecting said electrical contacts when said magnetic tape unit is loaded and providing logical electrical signals corresponding to said electrical contacts signal, and said magnetic tape grade identification means identifies said magnetic tape grade in accordance with said electrical signals.

7. A magnetic tape recording and reproduction apparatus according to claim 1, wherein said apparatus comprises a data recorder.

8. A magnetic tape recording and reproduction apparatus according to claim 1, wherein said apparatus comprises a video tape recording and/or reproducing apparatus.

9. A magnetic tape recording and reproduction apparatus according to claim 1, wherein said apparatus comprises an audio tape recording and/or reproducing apparatus.

10. A magnetic tape recording and reproduction apparatus according to claim 1, further comprising additional information recorded on said calibration magnetic tape; and wherein said execution means executes said self-diagnostic operation in accordance with said additional information.

11. A magnetic tape recording and reproduction apparatus according to claim 10, wherein said additional information comprises test data for recording on said magnetic tape and/or for reproducing said test data from said magnetic tape.

12. A magnetic tape recording and reproduction apparatus according to claim 11, wherein said additional information comprises directory data.

13. A magnetic tape recording and reproduction apparatus according to claim 1, wherein said execution means comprises conventional recording and/or reproduction means for recording data on said magnetic tape and/or reproducing said data recorded on said magnetic tape and means for cleaning a recording magnetic head and/or a reproducing magnetic head, and said magnetic tape comprises one of a general purpose magnetic tape and a cleaning tape.

* * * * *